United States Patent [19]

Yoshida

[11] Patent Number: 5,255,311
[45] Date of Patent: Oct. 19, 1993

[54] DATA COMMUNICATION APPARATUS

[75] Inventor: Takehiro Yoshida, Tokyo, Japan

[73] Assignee: Canon Kabushiki Kaisha, Tokyo, Japan

[21] Appl. No.: 691,493

[22] Filed: Apr. 25, 1991

[30] Foreign Application Priority Data

Apr. 27, 1990 [JP] Japan ................... 2-110127

[51] Int. Cl.⁵ .......................................... H04M 11/00
[52] U.S. Cl. .................... 379/100; 358/434; 358/468
[58] Field of Search ............... 379/100, 96, 97, 98, 379/102, 105; 358/400, 434, 435, 336, 437, 438, 439, 468

[56] References Cited

U.S. PATENT DOCUMENTS

| | | | |
|---|---|---|---|
| 3,914,538 | 10/1975 | Perreault et al. | 178/6 |
| 4,567,322 | 1/1986 | Tsuda | 179/2 A |
| 4,660,218 | 4/1987 | Hashimoto | 379/93 |
| 4,677,660 | 6/1987 | Yoshida | 379/100 |
| 4,773,080 | 9/1988 | Nakajima et al. | 375/5 |
| 4,800,439 | 1/1989 | Yoshino | 358/257 |
| 4,815,121 | 3/1989 | Yoshida | 379/67 |
| 4,821,312 | 4/1989 | Horton et al. | 379/97 |
| 4,908,851 | 3/1990 | Kotani et al. | 379/100 |
| 4,916,607 | 4/1990 | Teraichi et al. | 364/200 |
| 4,932,048 | 6/1990 | Kenmochi et al. | 379/67 |
| 4,939,772 | 7/1990 | Goto | 379/96 |
| 5,018,189 | 5/1991 | Kurosawa et al. | 379/93 |
| 5,022,071 | 6/1991 | Mozer et al. | 379/97 |

FOREIGN PATENT DOCUMENTS

| | | |
|---|---|---|
| 3402681 | 8/1984 | Fed. Rep. of Germany . |
| 63-098266 | 4/1988 | Japan . |
| 1-016071 | 1/1989 | Japan . |
| 2160072 | 12/1985 | United Kingdom ............... 379/100 |

OTHER PUBLICATIONS

Patent Abstracts of Japan, vol. 12, No. 335, (E-656), Sep. 9, 1988.
Patent Abstracts of Japan, vol. 13, No. 195 (E-754) (3543), May 10, 1989.

*Primary Examiner*—Jin F. Ng
*Assistant Examiner*—Jason Chan
*Attorney, Agent, or Firm*—Fitzpatrick, Cella, Harper & Scinto

[57] ABSTRACT

A data communication apparatus operates in a first switching mode in order to switch over between data communication and speech communication depending upon whether or not a signal indicating data communication mode is received within a predetermined period of time; a as well as second switching mode which switches over between data communication and speech communication depending upon whether or not a response signal to a procedure signal is received within a predetermined period of time. The apparatus has a detector that detects a state of the apparatus, and it selects one of the first and second switching modes.

8 Claims, 4 Drawing Sheets

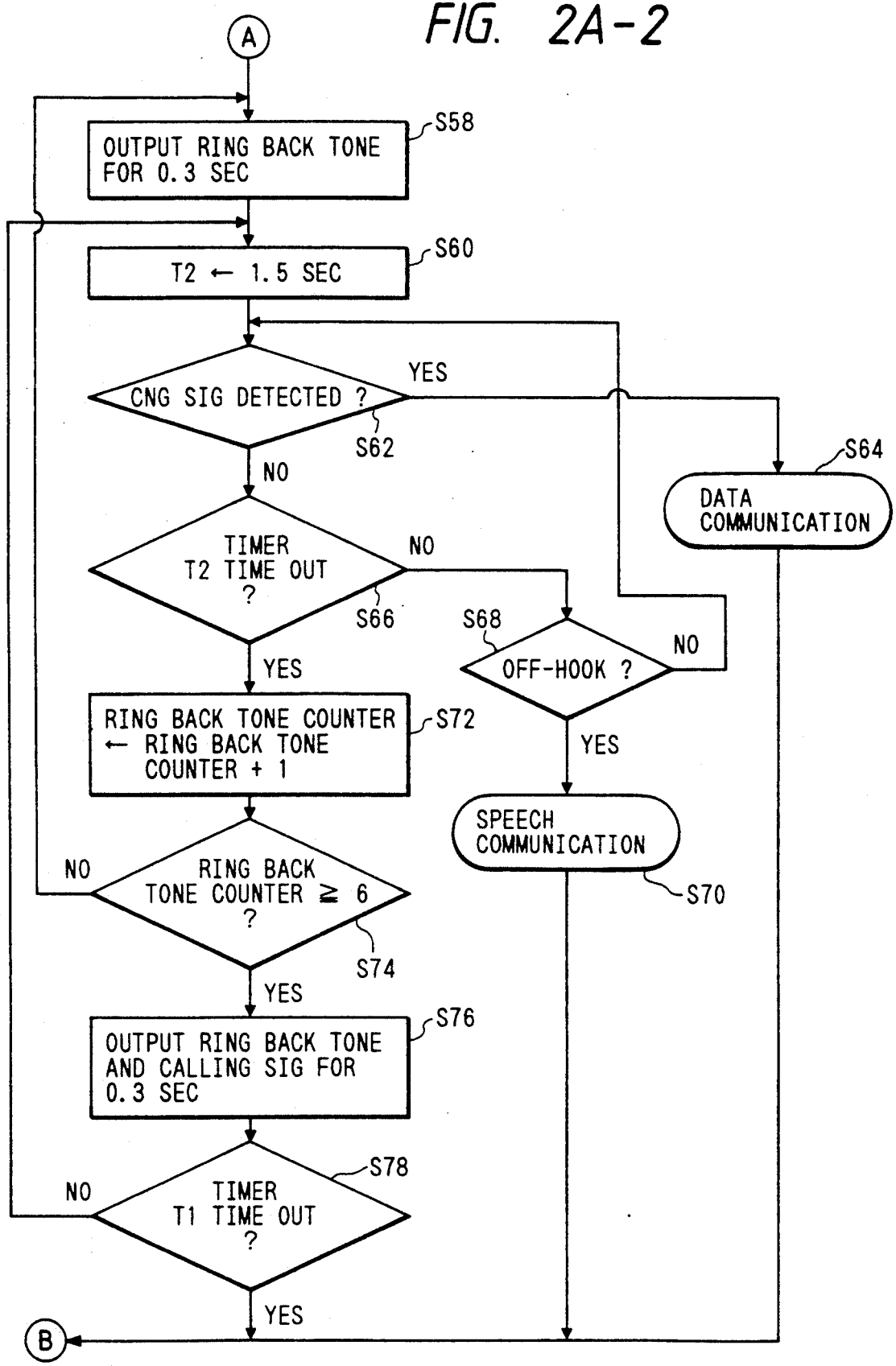

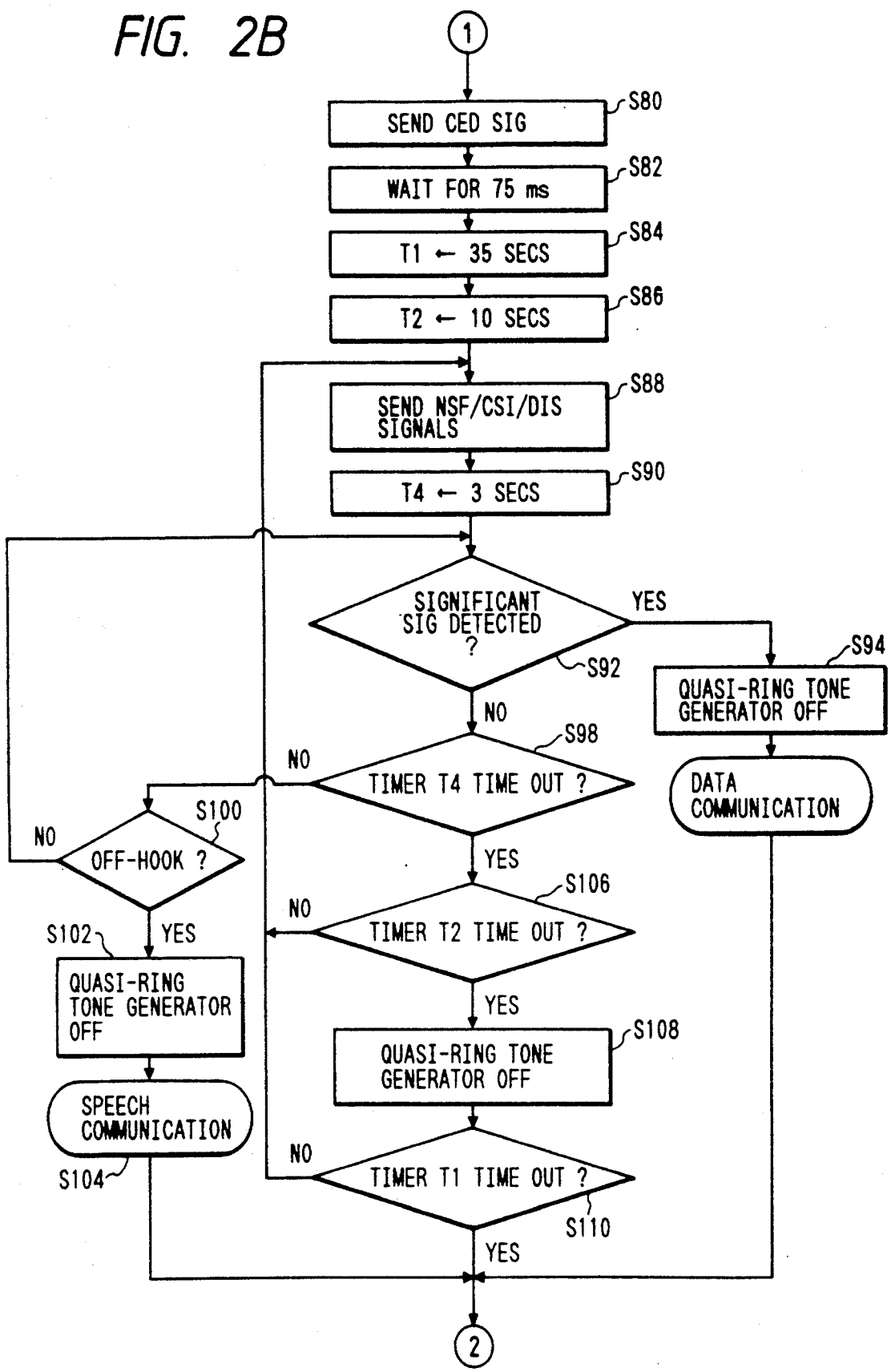

DATA COMMUNICATION APPARATUS

BACKGROUND OF THE INVENTION

1. Field of the Invention

The present invention relates to a data communication apparatus, particularly to a data communication apparatus which has functions of selectively switching data communication and speech communication automatically.

2. Related Background Art

Traditionally, in a facsimile apparatus, etc. there are known systems for judging automatically voice communication and data communication in an automatic reception mode.

The followings systems are known for selectively switching data communication mode and voice communication mode automatically. First, an example for switching to the data communication mode after receiving a call will be described in reference to a facsimile apparatus.

1) In unautomatic reception mode, as soon as a call is received, facsimile procedure signals (NSF/CSI/DIS, etc.) are transmitted, and when response signals (e.g. NSS/TSI/DCS, etc.) are received, image communication is followed. If no response signals are received, a quasi-ring tone is issued to call for an operator for speech communication. But, in some apparatuses facsimile procedure signals are detected even after the calling of an operator. In U.S. Pat. No. 4,677,660, an apparatus of this kind is disclosed.

2) There is known a system having a message answering sequence at the time of starting a reception control, in addition to the above function. Such message as "If you wish speech communication, please wait for a while. If you wish data communication, please push the start button" is sent. This system has the advantage that a proper message can be given to a caller to teach subsequent procedures without fail.

3) Like the above system 1), as soon as a call is received in an automatic reception mode, facsimile procedure signals (NSF/CFI/DIS signals, etc.) are transmitted, and then corresponding response signals (e.g. NSS/TSI/DCS signals, etc.) are received. At the same time when these signals are detected, a speech signal and others from a partner are discriminated. When the speech signal is detected, the judgment is made that the partner is trying to make speech communication, and the speech communication mode is chosen at once. The facsimile procedure signals may be detected even after the calling of an operator. U.S. Pat. No. 4,815,121 is directed to a system in which a mode is switched by detection of a speech signal.

4) As in the system 2), a message answering function is added to the system 3). Usually, after detection of a speech signal from partner station, such message as "Calling now. Please wait for a while" is sent.

5) In the above systems 1)-4), a quasi-ring tone is used to call an operator. This system outputs a signal sent from a calling station through a speaker. At a called station, a message may not be issued through the speaker. U.S. Pat. No. 4,773,080 is an example of a system which issues a message through a speaker.

The following is a system for automatically changing from a speech communication mode to a data communication mode.

6) Upon reception of a call, a significant signal (e.g. CNG signal) from a partner station is detected, and if this signal is received, data communication is selected. U.S. patent application Ser. No. 573,684 (filed on Aug. 28, 1990) relates to a system which detects a CNG signal while sending a ring-back tone (quasi-reception tone) to the partner station at the time of the reception of a call. After transmission of this ring back tone, if no significant signal is detected after the lapse of a predetermined time period, an operator is called. This system gives priority to a speech communication mode since the ring back tone is always sent to a calling party after the reception of a call. A system for switching over a mode by detection of the CNG signal is disclosed in U.S. Pat. Nos. 4,800,439; 4,932,048; and 4,916,607.

However, in a conventional apparatus, data communication and speech communication are automatically switched over by one determined system regardless of communication condition.

For this reason, in automatic switchover from the data communication to the speech communication, unless a message response is made as in the above system 1), an operator may erroneously consider completion of dialing to a facsimile equipment and disconnect a line.

If a speech answering function is added, an apparatus is more expensive and communication time is always prolonged by the time corresponding to the message response.

In the case of a system (the above 6) in which priority is given to a speech communication mode and thereafter a mode is switched to data communication, there is a serious problem that polling transmission cannot be done. For instance, even if a call is received and CNG signal detection is executed while transmitting a ring-back tone, if the CNG signal is not detected when a calling station requests the polling because whether a mode is manual or automatic, the calling station is in a state of reception. So, it is impossible to shift to data communication and conduct the polling.

SUMMARY OF THE INVENTION

It is an object of the present invention to improve data communication apparatus in light of the above-mentioned problems.

Another object of the present invention is to provide a data communication apparatus which has a plurality of switch-over modes between data communication and speech communication and selects automatically an appropriate one to the plural modes in accordance with a condition of the apparatus.

Another object of the present invention is to provide a data communication apparatus which has at least first and second modes as the switchover modes of data communication/speech communication and selects automatically an appropriate switchover mode according to a condition of the apparatus.

Another object of the present invention is to provide a data communication apparatus which has at least first second modes as the switchover modes of data communication/speech communication and selects automatically one of the first and the second modes according as whether data for communication is set or not. Other objects of the present invention will be evident from the following detailed explanation of embodiments and attached drawings.

BRIEF DESCRIPTION OF THE DRAWINGS

FIGS. 2A, 2A-1, 2A-2 and 2B are flow charts showing a control operation of the embodiment.

DETAILED DESCRIPTION OF THE PREFERRED EMBODIMENTS

One embodiment of the present invention will be explained in detail with reference to drawings as hereinbelow.

While a facsimile apparatus is considered in be following embodiment, the present invention can be applied not only to a facsimile apparatus but also to various kinds of data communication equipments such as a telex machine.

Figure 1:
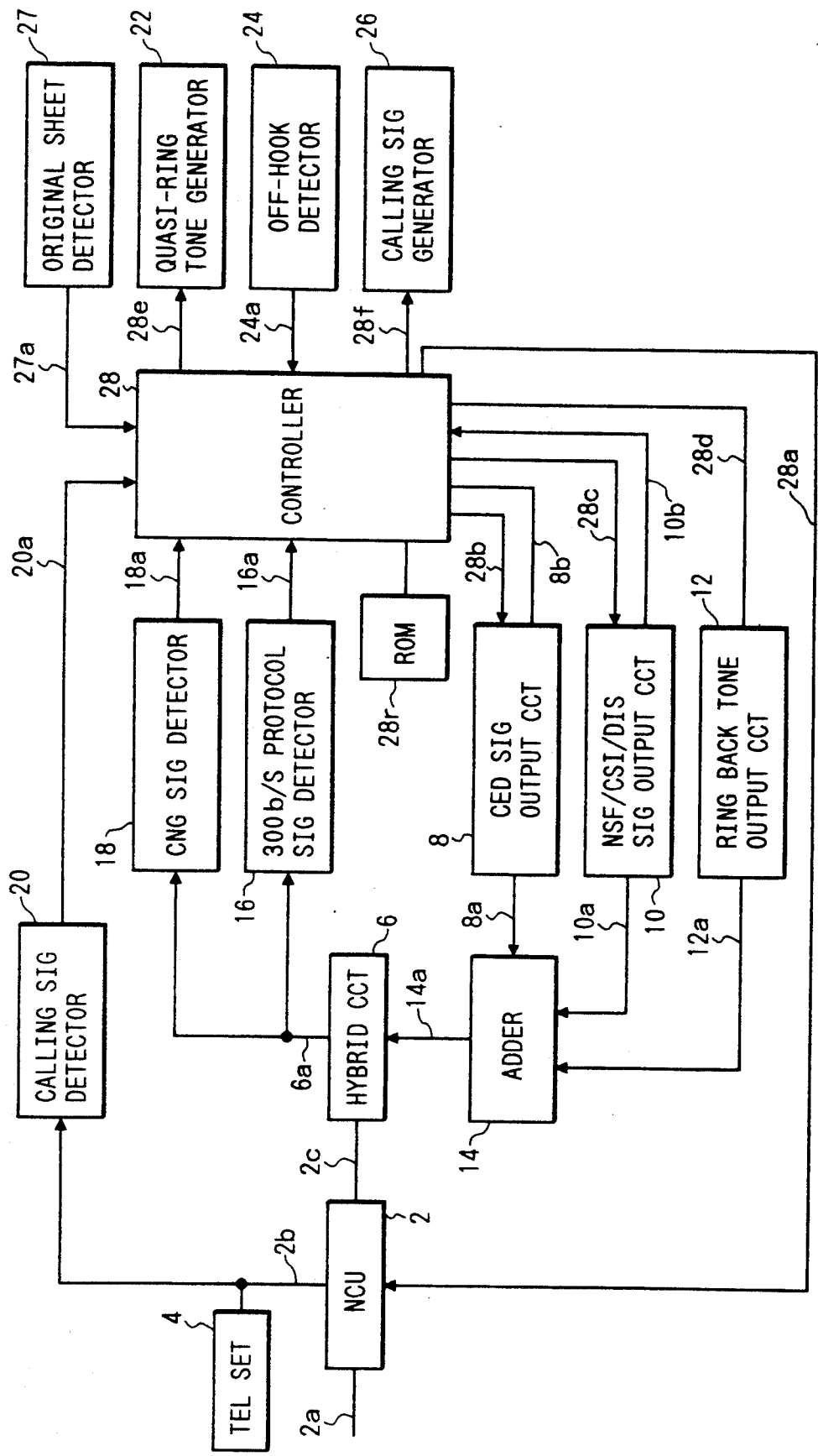
FIG. 1 is a block diagram showing a structure of a facsimile apparatus according to one embodiment of the present invention.

FIG. 1 is a block diagram showing a structure of the facsimile apparatus of the present embodiment. Here, only the circuit necessary for reception control is illustrated.

As shown in the Figure, a telephone line 2a is connected to NCU 2. To the NCU 2 is connected a telephone set 4 as a speech terminal via a signal line 2b.

As a non-speech terminal, a facsimile communication system after a hybrid circuit 6 is connected via a signal line 2c. A control circuit 28 controls a switchover operation of the NCU 2 via a signal line 28a. Data "0" to "3" are sent to the NCU 2, and the line 2a is connected either to the hybrid circuit 6 or the telephone set 4 according to respective data values. The facsimile apparatus after the hybrid circuit 6 is structured as follows.

Firstly, the hybrid circuit 6 is used to separate a received signal and a sending signal. The sending signal is input from a signal line 14a and the received signal is output via a signal line 6a.

A transmission system comprises an adder 14, output circuits indicated by numerals 8, 10 and 12, a modulator (not shown) and an image input device (not shown).

The adder 14 sums signals input from the CED signal output circuit 8, NSF/CSI/DIS signal output circuit 10 and ring-back tone output circuit 12 via signal lines 8a, 10a and 12a respectively.

The CED signal output circuit 8 outputs a CED signal to the adder 14 via the signal line 8a by inputting a pulse signal to a signal line 28b and generates a pulse signal on a signal line 8b at the end of transmission of the CED signal.

The NSF/CSI/DIS signal output circuit 10 outputs NSF/CSI/DIS signals to the adder 14 via a signal line 10a by inputting a pulse signal to a signal line 28c and generate a pulse signal on a signal line 10b at the end of transmission of the signal.

The ring-back tone output circuit 12 outputs a ring back tone to the adder 14 via a signal line 12a by inputting a pulse signal to a signal line 28d. An output from the hybrid circuit 6 is input to two signal receiving circuits, namely a protocol signal detection circuit 16 and a CNG signal detection circuit 18.

The protocol signal detection circuit 16 and the CNG signal detection circuit 18 detect a facsimile procedure signal of 300 bps and a CNG signal (facsimile calling signal). If a target signal is detected, pulse signals are output to the control circuit 28 via signal lines 16a and 18a.

An incoming call is detected by a calling signal detection circuit 20 connected, with the telephone set 4, to the line 2b. When the calling signal detection circuit 20 detects the calling signal, a pulse signal is output to the control circuit 28 via a signal line 20a.

In the present embodiment, information as to the existence or non-existence of an original sheet at the transmission part is used for the switchover of communication mode at the time of call reception. So, an original sheet detection circuit 27 comprising photosensors, etc. is provided. When the sheet is detected, the original sheet detection circuit outputs a signal of level "1" to the control circuit 28 via a signal line 27a.

A quasi-ring tone generating circuit 22 is used to call an operator and comprises an oscillator a speaker, etc. When a signal on a signal line 28e is of level "1", a quasi-ring tone is issued, whereas when the signal is of level "0", the quasi-ring tone is ceased.

In the present embodiment, information about a hook condition of the telephone set 4 is used for the switchover of communication mode at the time of call reception, an off-hook detection circuit 24 is provided to detect the hook condition of the telephone set 4.

When the telephone set 4 is off-hook, the off-hook detection circuit 24 outputs a signal of level "1" to a signal line 24a. If the telephone set 4 is on-hook, a signal of level "0" is output to the signal line 24a.

Numeral 26 is a calling signal generation circuit which generates a signal synchronously with transmission timing of the ring-back tone. The calling signal generation circuit 26 generates a calling signal when a signal on a signal line 28f is of level "1", and ceases the calling signal when the signal is of level "0".

The control circuit 28 comprises a microprocessor, a RAM, etc. and controls an operation of the apparatus according to a control program stored in a ROM 28r.

Then, an operation of the apparatus structured as above-mentioned will be described.

Figures 1, 2, 2A:
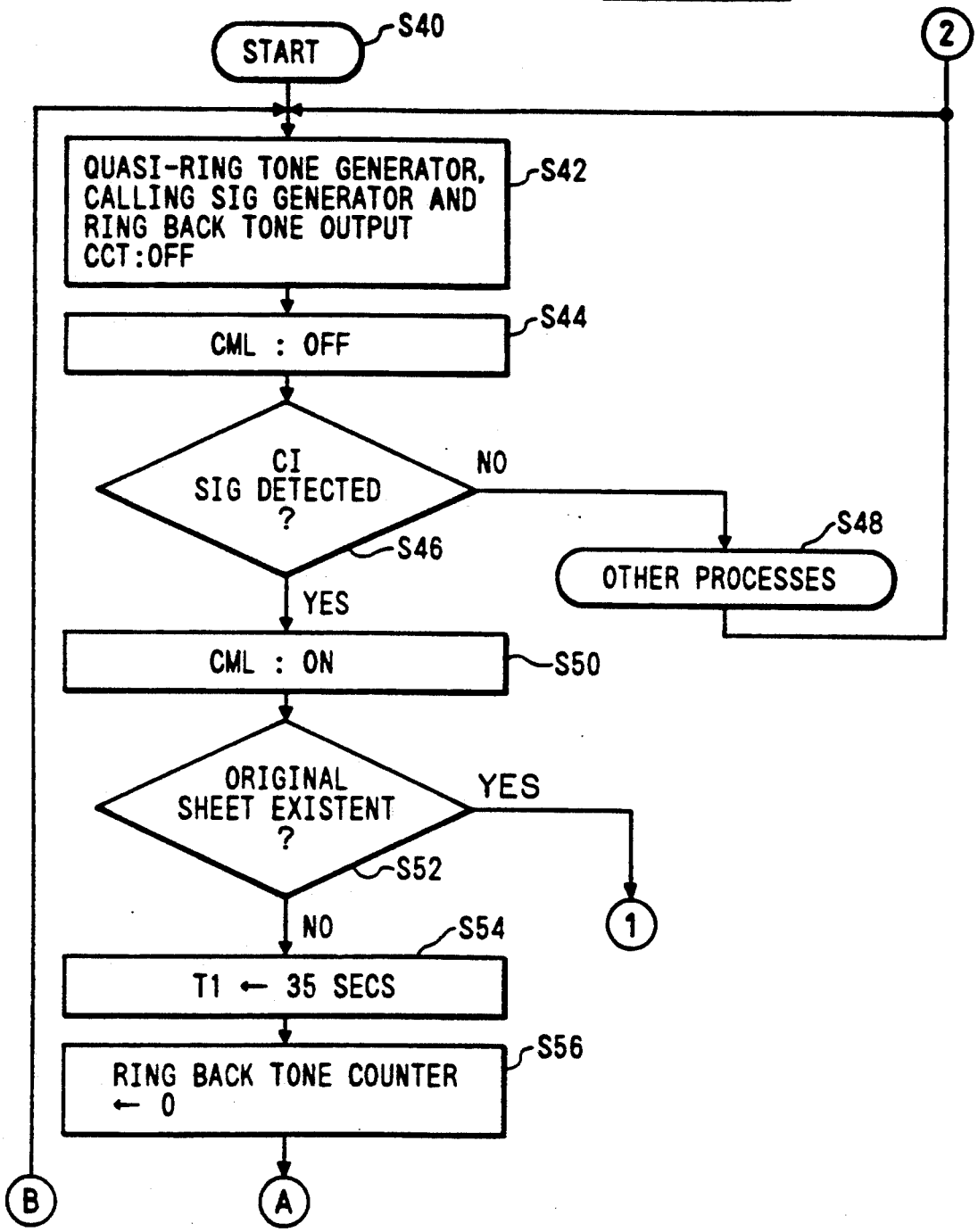

FIGS. 2A and 2B show control procedures of the control circuit 28 stored in the ROM 28a. Step S42 of FIG. 2A, the signal of "0" is output to the signal lines 28e, 28f and 28d to cease the quasi-ring tone, the calling tone and the ring-back tone.

In Step S44, the signal of "0" is output to the signal line 28a to turn off a CML relay of the NCU 2 an connect the line to the telephone set 4.

In Step S46, a signal on the signal line 20a is input to judge whether a CI signal (a calling signal of 16Hz) is detected or not. If the CI signal is detected, the flow goes to Step S50 and, if not, to Step 48 for other processing.

In Step S50, the signal of "1" is output to the signal line 28a to turn on the CML relay.

In Step S52, a signal on the signal line 27a is input to judge whether the original sheet is set on a sheet table or not. If the sheet is set on the sheet table, the flow goes to Step S80 and, if not, to Step S54.

Steps S54 to S78 show an automatic switchover mode from speech communication to data communication in which priority is given to the speech communication mode relating to a calling station. If data communication is to be conducted, the mode is switched to the data communication mode.

In Step S54, a T1 timer is set to 35 seconds.

In Step S56, a ring back tone counter for counting the number of times of transmission of the ring-back tone used for calling an operator, is cleared.

In Step S58, the signal of level "1" is output to the signal line 28d for 0.3 seconds and the ring-to back tone is sent to the calling station for 0.3 seconds.

In Step S60, a timer t2 (not shown) is set to 1.5 seconds.

In Step S62, a signal on the signal line 18a is input to judge whether the CNG signal is detected, and in Step S68, a signal on the signal line 24a is input to judge whether the telephone set is off-hook. If the CNG signal is detected before the timer T2 times out, the apparatus shifts to the data communication mode (Step S64), and if the off-hook is detected before the timer T2 times out, the apparatus shifts to the speech communication mode (Step S70). If the timer T2 timers out, the flow goes to Step S72, the ring-back tone counter is incremented.

In Step S74, it is judged whether the ring-back tone counter counts 6 or more. If 6 or more, the flow goes to Step S76, and if less than 6, goes to Step S58.

In Step S76, the signal of level "1" is output to the signal line 28d and the signal line 28f for 0.3 seconds, and the ring back-tone is sent to the calling station for 0.3 seconds. At the same time, the calling signal for calling an operator is issued for 0.3 seconds.

In Step S78, it is judged whether the timer T1 (not shown) times out. If it does not time out, the flow goes to Step S60, and if it times out, goes to Step S42.

Steps S80 to S110 of FIG. 2B show an automatic switchover mode from data communication to speech communication in which priority is given to the data communication mode relating to the calling station. If the speech communication is to be conducted, the mode is switched to the speech communication mode.

In Step S80, a pulse signal is provided on the signal line 28b to send the CED signal.

In Step S82, 75 ms is waited for.

In Step S84, the timer T1 (not shown) is set to 35 seconds.

In Step S86, the timer T2 is set to 10 seconds. In case a significant signal is not detected from the partner station within a specified period of time, an operator is called. The timer T2 is used for measurement of such specified period of time.

In Step S88, a pulse signal is provided on the signal line 28c to transmit the NSF/CSI/DIS signals.

In Step S90, the timer T4 (not shown) is set to 3 seconds as response reception time period.

In Step S92, signals on the signal lines 16a and 18a are input to judge whether a significant signal (e.g. CNG signal, NSS/TSI/DCS signal, NSC/CIS/DTC signal) is detected. If a significant signal is detected, the flow goes to Step S94 and, if not, goes to step S98.

In Step S94, the signal of level "0" is output to the signal line 28e to cease the quasi-ring tone. Step S96 represents the data communication mode.

In Step S98, it is judged whether the timer T4 times out. If the timer times out, the flow goes to Step S106 and, if not, goes to Step S100.

In Step S100., a signal on the signal line 24a is input to judge whether the telephone set is off-hook or not. In the case of the off-hook, the signal of level "0" is output to the signal line 28e to cease the quasi-ring tone (Step S102) and switch the mode to the speech communication mode (Step S104). If not off-hook, the flow goes to Step S92.

In Step S106, it is judged whether the timer T2 times out. If it does not time over, the flow goes to Step S88 and, if it times out, the flow goes to Step S108.

In Step S108, the signal of level "1" is output to the signal line 28e to issue the quasi-ring tone.

In Step S110, it is judged whether the timer T1 times out. If it does not time out, the flow goes to Step S88 and, if it times out, goes to Step S42.

In the above structure, according to a condition of the facsimile apparatus speech communication or facsimile communication is preferentially selected at the time of call reception, thereby switching over from one mode to the other mode automatically.

In one automatic call reception mode, if there is no sheet, priority is given to the facsimile communication mode and the CNG signal is detected while sending the ring-back tone. When the CNG signal is detected, facsimile communication is executed. If the CNG signal cannot be detected within a predetermined period of time, the mode is switched to the speech communication mode automatically to issue the quasi-ring tone to call an operator.

On the other hand, in the case of the automatic call reception, if there is a sheet priority is given to facsimile communication mode. If a facsimile signal from the partner station is detected, facsimile communication is conducted. If a significant facsimile signal is not detected within a specified period of time, mode is switched to the speech communication mode automatically to produce the quasi-ring tone to call an operator.

Since "on-calling" can be indicated by the ring-back tone if the partner station wishes speech communication, it can avoid the partner disconnecting the line. On the other hand, if the sheet is set, the polling process is enabled.

In the above-mentioned embodiment if there is no sheet, the off-hook detection of the telephone set 4 is executed only when the CNG signal detection is performed. The off-hook detection may also be conducted at the time of transmission of the ring-back tone to switch over to the speech communication mode according to the result of the detection.

Also, in case there is a sheet, the off-hook detection of the telephone set 4 is done only while the response signal is received. However, the off-hook detection may be conducted also when the NSF/CSI/DIS signals are transmitted to switch over to the speech communication mode according to the result of the detection.

Also, in the case of no sheet, the transmission of the ring-back tone may be done under conditions other than the above-mentioned interval condition.

Further, the transmission of a calling signal in the case of no sheet is not done using the output of the calling signal generation circuit 26, but may be conducted using the quasi-ring tone from the quasi-ring tone generation circuit 22.

If there is a sheet, it is considered as a condition for switchover to the speech communication mode that a significant signal is not detected for 10 seconds. But the mode may be switched to the speech communication according to the detection of a speech signal from the partner station.

A sheet at an image input device may be directly detected by a photosensor. But in an apparatus having a mode for reading an original image into an image memory, a sheet may be detected according to the existence of data store within the memory.

In the above embodiment, a facsimile apparatus has been illustrated. With respect to another data communication apparatus too, the same structure can be applied. Furthermore, the present invention is not limited to the above-mentioned embodiment but can be modified in various ways.

I claim:

1. A data communication apparatus having a first switchover mode and a second switchover mode for switching over between data communication and speech communication, comprising:

detection means for detecting a condition of the apparatus; and control means for selecting one of said first switchover mode and said second switchover mode according to the detection by said detection means and for conducting automatic switchover control between data communication and speech communication in the selected switchover mode, said wherein, in said first switchover mode, said detection means detects whether a signal indicating data communication is received while outputting a signal indicating the hook condition of a telephone set, and said data communication apparatus conducts data communication if the signal indicating data communication is received and speech communication if the signal indicating data communication is not received within a first predetermined period of time, and wherein, in said second switchover mode, said data communication apparatus sends a procedure signal for data communication, said detection means detects whether a response signal to the transmitted procedure signal is received within a second predetermined period of time, and said data communication apparatus conducts data communication if the response signal is received within the second predetermined period of time and a process for speech communication if the response signal is not received.

2. An apparatus according to claim 1, wherein said detection means detects whether the communication data is set or not.

3. A method switching over between data communication and speech communication, provided with at least a first switchover mode and a second switchover mode, said method comprising the steps of:

detecting a condition of a data communication apparatus;

selecting one of the first switchover mode and the second switchover mode according to the result of the said etection; and conducting an automatic switchover control between data communication and speech communication in the selected switchover mode, wherein, in said first switchover mode, if a signal indicating data communication is detected while outputting a signal indicating the hook condition of a telephone set, data communication is conducted, and if the signal indicating data communication is not received within a first predetermined period of time, speech communication is conducted, and wherein, in said second switchover mode, a procedure signal is sent for data communication, and if a response signal to the transmitted procedure signal is detected within a second predetermined period of time, data communication is conducted, and if the response signal is not received within the second predetermined period of time, a process for speech communication is conducted.

4. A method according to claim 3, wherein said detection step, it is detected whether communication data is set in the data communication apparatus.

5. A data communication apparatus comprising:

a first switchover means which, responsive to an incoming call, discriminates whether a signal indicating data communication is received, and switches over automatically between data communication and speech communication in accordance with the discrimination result as to whether a signal indicating data communication is received;

a second switchover means which, responsive to the incoming call, sends a procedure signal for data communication, discriminates whether a response signal to the procedure signal is received within a first predetermined time period, and switches over automatically between data communication and speech communication in accordance with the discrimination result as to whether a signal indicating data communication is received;

detection means for detecting a condition of said apparatus; and means for selecting one of said first switchover means and said second switchover means according to the detection by said detection means, wherein the selected switchover means automatically switches over between data communication and speech communication.

6. An apparatus according to claim 5, wherein said detection means detects whether the communication data is set or not.

7. An apparatus according to claim 5, wherein in said first switchover means, said detection means detects whether the signal indicating data communication is received while sending a signal indicating the hook condition of a telephone set, and if the signal indicating the data communication is received within a second predetermined period of time, in said first switchover means, said data communication apparatus selects data communication while if not, selects speech communication.

8. An apparatus according to claim 5, wherein in said second switchover means, said data communication apparatus sends the procedure signal for data communication and detects whether the response signal to the transmitted procedure signal is received within the first predetermined period of time, and if the response signal is received within the first predetermined period, in said second switchover means, said data communication apparatus continues the data communication, while if not, it selects the speech communication.

* * * * *

UNITED STATES PATENT AND TRADEMARK OFFICE
CERTIFICATE OF CORRECTION

PATENT NO. : 5,255,311

DATED : October 19, 1993

INVENTOR(S) : TAKEHIRO YOSHIDA

It is certified that error appears in the above-identified patent and that said Letters Patent is hereby corrected as shown below:

ON TITLE PAGE

AT [57] ABSTRACT, Line 6, "a as well as" should read --as well as a--.

COLUMN 2

Line 6, "ring back" should read --ring-back--.
Line 10, "ring back" should read --ring-back--.
Line 50, "to" should read --of--.
Line 60, "first" should read --first and--.

COLUMN 3

Line 12, "as herein-" should be deleted.
Line 14, "be" should read --the--.
Line 53, "generate" should read --generates--.
Line 55, "ring" should read --ring- --.

COLUMN 4

Line 13, "oscillator a" should read --oscillator, a--.
Line 16, "is ceased." should read --ceases.--.
Line 35, "Then," should read --Now,--.
Line 43, "an" should read --and--.
Line 63, "ring back" should read --ring-back--.
Line 67, "ring-to back" should read --ring-back--.

COLUMN 5

Line 1, "timer t2" should read --timer T2--.
Line 11, "timers" should read --times--.
Line 56, "Step S100.," should read --Step S100,--.
Line 64, "over," should read --out,--.

UNITED STATES PATENT AND TRADEMARK OFFICE
CERTIFICATE OF CORRECTION

PATENT NO. : 5,255,311
DATED : October 19, 1993
INVENTOR(S) : TAKEHIRO YOSHIDA

It is certified that error appears in the above-identified patent and that said Letters Patent is hereby corrected as shown below:

<u>COLUMN 6</u>

Line 15, "the" (second occurrence) should be deleted.
    Line 23, "mode" should read --the mode--.
    Line 24, "the" should be deleted.
    Line 36, "the" should be deleted.
    Line 62, "store" should read --stored--.

<u>COLUMN 7</u>

Line 38, "method" should read --method of--.
    Line 46, "etection;" should read --detection;--.

<u>COLUMN 8</u>

Line 7, "wherein" should read --wherein, in--.
    Line 46, "communication" should read --communication,--.

Signed and Sealed this

Fifth Day of July, 1994

Attest:

BRUCE LEHMAN

*Attesting Officer*      *Commissioner of Patents and Trademarks*